United States Patent
Kasowski et al.

(10) Patent No.: US 7,138,443 B2
(45) Date of Patent: Nov. 21, 2006

(54) REACTION PRODUCT OF A PHOSPHOROUS ACID WITH ETHYLENEAMINES, FORMALDEHYDE, AND AMINE FOR FLAME RESISTANCE

(76) Inventors: Robert Valentine Kasowski, 2153 Brinton's Bridge Rd., West Chester, PA (US) 19382; Maya Meltzer Kasowski, 2153 Brinton's Bridge Rd., West Chester, PA (US) 19382

(*) Notice: Subject to any disclaimer, the term of this patent is extended or adjusted under 35 U.S.C. 154(b) by 0 days.

(21) Appl. No.: 10/497,129

(22) PCT Filed: Dec. 5, 2002

(86) PCT No.: PCT/US02/38855

§ 371 (c)(1),
(2), (4) Date: Sep. 20, 2004

(87) PCT Pub. No.: WO03/049812

PCT Pub. Date: Jun. 19, 2003

(65) Prior Publication Data

US 2005/0029499 A1    Feb. 10, 2005

Related U.S. Application Data

(60) Provisional application No. 60/393,674, filed on Jul. 3, 2002, provisional application No. 60/349,676, filed on Jan. 18, 2002, provisional application No. 60/340,476, filed on Dec. 7, 2001.

(51) Int. Cl.
*C09K 21/12* (2006.01)
(52) U.S. Cl. ............... 523/179; 252/606; 524/138; 524/148
(58) Field of Classification Search ............... 523/179; 524/138, 148; 252/606
See application file for complete search history.

(56) References Cited

U.S. PATENT DOCUMENTS 4,369,064 A    1/1983    von Bonin
6,730,381 B1 *  5/2004    Horacek ............... 428/36.8

FOREIGN PATENT DOCUMENTS

WO    WO 01/77217    10/2001

* cited by examiner

*Primary Examiner*—Peter Szekely
(74) *Attorney, Agent, or Firm*—RatnerPrestia

(57) ABSTRACT

Flame retardants, and compositions containing the flame retardants are disclosed. The flame retardants are prepared reacting ethylene diamine with polyphosphoric acid; or reacting an ethyleneamine or a mixture of ethyleneamines with phosphoric acid, polyphosphoric acid, pyrophosphoric acid, or a mixtures thereof. A 10% by weight solution of the product in water has a pH between about 3.5 to 6.5. The flame retardants are non-halogen containing flame retardants that do not gas undesirably during processing at temperatures of 235° C. or even higher.

25 Claims, No Drawings

REACTION PRODUCT OF A PHOSPHOROUS ACID WITH ETHYLENEAMINES, FORMALDEHYDE, AND AMINE FOR FLAME RESISTANCE

CROSS-REFERENCE TO RELATED APPLICATIONS

This application is the U.S. National Phase Application of PCT International Application PCT/US02/38855, which claims priority on U.S. Provisional Application 60/393,674, filed Jul. 3, 2002, on U.S. Provisional Application 60/359,676, filed Jan. 18, 2002, and on U.S. Provisional Application 60/340,476, filed Dec. 7, 2001.

FIELD OF INVENTION

This invention relates to flame retardants and compositions containing these flame retardants (FR) as well as a method for the preparation of the flame retardants.

BACKGROUND OF INVENTION

Flame retardants that work via the mechanism of intumescence usually do not contain halogens. The flame-retardant mechanism of intumescence has been reviewed. (For a review of intumescence in coatings and polymers: Don G. Brady, C. Wayne Moberly, John R. Norell, and Harold C. Walters, J. Fire Retardant Chemistry, 4, p150 (1977)). The intumescent flame retardant mechanism requires an inorganic acid source, a carbon source such as a polyhydric material like dipentaerythritol, and a blowing agent, which is often an amine like urea or melamine. Optionally, a halogen containing compound can be added for better activity. For coatings, the flame retardant includes the following types of compounds: a mineral acid salt such as sodium phosphate or practically water insoluble ammonia polyphosphate, a polyol such as starch, pentaerythritol, or dipentaerythritol, and a blowing agent such as melamine. The standard theory is that in a fire, the heat causes the mineral acid salt to decompose to form an acid, the acid dehydrates the polyol to form char, and the blowing agent decomposes to gaseous products. The result is char and gas that forms a foam that is much thicker than the original article or coating containing these flame retardants. A sequence of events with respect to formation of acid, dehydration of polyol, and release of gas must occur in the correct order and time sequence for the gas and char to form a protective foam. Different polymers may require different ingredients or amounts of ingredients to achieve similar levels of flame retardation. It is believed that the polymer and the flame retardant must have similar decomposition temperatures. Thus, different mineral acid salts, polyols, or blowing agents are used in different applications and there is no universal recipe.

Therefore, a need exists for a single compound that performed all the tasks of the mineral acid salt, the polyol, and the blowing agent and be generally applicable to a wide variety of polymers. Intumescence can be difficult to achieve in practice. It is often difficult for three or more ingredients to be well mixed in applications such as flame retarding a polymer. Good mixing of three ingredients in coating applications can be difficult if the ratio of solids content to solvent is very high. It is much more difficult to flame retard a polymer with three ingredients, because the above intumescence agents are added to the polymer melt. Relatively high viscosity of the polymer melt prevents easy mixing of flame retardants to obtain a homogeneous mix and good performance. Mixing a melted polymer for a long time to obtain a good dispersion of the flame retardants is unacceptable as the polymer can degrade if held above melt temperature too long. The flame resistance of polyolefins such as polypropylene can be improved by adding melamine pyrophosphate (MPP) and dipentaerythritol. (as taught in U.S. Pat. No. 3,936,416, 1976). This patent teaches that multiple components need be mixed into the polypropylene for good flame retardant performance via intumescence, as melamine pyrophosphate by itself requires too high a loading. Flame retardant performance will be dependent on uniformity of mixing of the components melamine pyrophosphate and dipentaerythritol into polypropylene. A single compound flame retardant would be easier from a mixing standpoint as maintaining the flame retardant in close proximity and balance throughout would not be as crucial. For plastics in general, it is difficult to disperse the ingredients as each ingredient may disperse differently or even agglomerate in the polymer melt.

Ethylene diamine phosphate (EDAP), which has some intumescence, is an excellent flame retardant for olefins such as polypropylene. Unfortunately, commercial extruders process polypropylene at about 235° C. which is too high a temperature to safely use EDAP without extensive ventilation to capture ethylene diamine that is released. Thus, it would be most desirable to make flame retardants that are more stable than EDAP and which would be good flame retardants for polymers such as polypropylene. Flame retardants such as EDAP require special conditions on commercial extruders to be used without decomposition. A flame retardant that is stable under standard processing conditions is highly desirable.

A single compound that intumeses is discussed in PCT/US01/09514. The most preferred examples are given as methylol melamine salts of polyphosphoric acid or pyrophosphoric acid. Such compounds gas during extrusion and molding leading to undesirable mechanical properties. These compounds do not partially dissolve into the polymer during compounding as these compounds are not resinous in appearance or behavior. The best practice compounds are not as effective in flame retarding olefin polymers as the compounds described herein. Examples 6 and 7 of PCT/US01/09514 describe preparation of ethylene diamine reaction product with pyrophosphoric acid. The preparations used too much ethylene diamine and the preparations contained pyrophosphoric acid contaminated with substantial sodium resulting in the formation of white particulate that could be filtered and dried, unlike the flame retardants of the invention. The procedures in PCT/US01/09514 utilize drying and filtering, not evaporation.

The flame retardants of the invention address the need for such a more temperature stable flame retardant agent for olefins and other polymers which does not gas undesirably during processing, and which can be machine processed at temperatures 235° C. or even higher.

SUMMARY OF INVENTION

This invention provides flame retardant compounds that provide flame retardation for a variety of applications, such as replacement of flame retardants containing halogens. The flame retardant used in many applications contain brominated or chlorinated compounds. There is a ready market for flame retardants that do not contain halogens which this invention addresses.

This invention is a composition comprising:

a) 30 to 99.75 percent by weight of a polymeric material; and b) 0.25 to 70 percent by weight of a flame retardant composition prepared by the method of:

reacting ethylene diamine with polyphosphoric acid; or reacting an ethyleneamine or a mixture of ethyleneamines with an acid selected from the group consisting of phosphoric acid, polyphosphoric acid, pyrophosphoric acid, and mixtures thereof;

in which the ratio of the acid or acid mixture to the ethylene diamine, the ethyleneamine, or mixture of ethyleneamines is such that a 10% by weight solution of b) in water has a pH between about 3.5 to 6.5.

The flame retardant behavior of this composition can be improved by addition of about 0.25 to 1% of anti drip agent relative to weight of composition and/or 4.0 to 30% of amine selected from the group consisting of melamine, melamine phosphate, melamine pyrophosphate and mixtures thereof relative to weight of composition. Other amines and their salts are likely to be effective as well.

The flame retardant composition can be prepared by a method additionally comprising the step of reacting the ethylene diamine, the ethyleneamine, or mixture of ethyleneamines with formaldehyde and melamine before reacting the ethylene diamine, the ethyleneamine, or mixture of ethyleneamines with the acid or mixture of acids. Such additional step improves the intumescent behavior.

To improve handling behavior, the flame retardant composition can be prepared by a method additionally comprising the step of pellitizing into particles of at least 30 microns in diameter on average and/or coating the flame retardant composition with a water resistant thermoplastic or thermoset.

The composition can be in any form such as fiber, film, coating, or solid object. Compositional range is complex as fibers and films are unlikely to contain particulates. Components such as anti drip agents and melamine phosphate or melamine pyrophosphate are more useful for molded products.

Other ingredients may be added to these compositions: For example, pigments are added for color. Mica, nano-clay, chopped glass, carbon fibers, aramids, and other ingredients can be added to alter mechanical properties. Other flame retardants both non-halogen and halogen can be added to form a flame retarded composition in order to capture synergies between different chemistries. Anti drip agents are fluorinated polymeric compounds that cause polymer compositions to resist dripping when subjected to flame retardance testing.

It was unexpected that the flame retardant compositions intumesce when subjected to a flame although no polyhydric component with hydroxyl groups is present, which is easily observed by subjecting flame retardant composition to propane torch. It was unexpected that the flame retardant compositions were much more stable than EDAP in that very little weight loss occurs at 250° C. relative to EDAP when heated in a vacuum oven for 20 minutes. It was unexpected that many of the flame retardant compositions melt before decomposing. It is also unexpected that melting behavior enables the flame retardant compositions to easily blend into polymers such as polypropylene and polyethylene on what appears to be molecular dispersion as no particles are apparent, with similar behavior expected for other polymer groups. Molecular dispersion or very small particle dispersion apparently obtained here gives more effective flame retardance. It was unexpected that an apparent synergy occurs when the flame retardant composition is added to polymers along with melamine or melamine phosphate. It was unexpected that addition of an anti drip agent at 1% level improves flame retardant behavior so that less flame retardant composition need be added. It was also unexpected that the composition consisting of the flame retardant composition, melamine pyrophsophate, anti drip agent and polypropylene could all be added together at the feed throat of a twin screw extruder and obtain flame retarded polymeric composition with excellent mechanical properties, as addition of EDAP at the feed throat with the polymer, MPP, and anti drip agent would lead to foamed product which is highly undesirable. The sum total of unexpected results provide a commercially useful halogen free flame retarded polymeric composition.

DETAILED DESCRIPTION OF INVENTION

The composition described herein is in its most general form the reaction product of ethyleneamines, optionally an amine, and optionally formaldehyde with phosphoric, pyrophosphoric and/or polyphosphoric acid.

Ethyleneamines are defined here as polymeric forms of ethylene diamine with three or more nitrogen atoms and including piperazine and its analogues. A thorough review of ethylene diamine and ethyleneamines can be found in the Encyclopedia of Chemical Technology, Vol 8, pgs. 74–108. Ethyleneamines encompass a wide range of multifunctional, multireactive compounds. The molecular structure can be linear, branched, cyclic, or combinations of these. Examples of commercial ethyleneamines are diethylenetriamine (DETA), piperazine (PIP), triethylenetetramine (TETA), tetraethylenepentamine (TEPA), and pentaethylenehexamine (PEHA). Other compounds which may be applicable are, aminoethylenepiperazine, 1,2-propylenediamine, 1,3-diaminopropane, iminobispropylamine, N-(2-aminoethyl)-1,3-propylenediamine, N, N'-bis-(3-aminopropyl)-ethylenediamine, dimethylaminopropylamine, and triethylenediamine.

Certain acids are expensive to obtain in very pure form. Pyrophosphoric and polyphosphoric acid can be contaminated with orthophosphoric acid unless freshly prepared as these two acids convert to orthophosphoric in aqueous medium, with the rate being dependent on many factors such as temperature and water content. Pyrophosphoric and polyphosphoric acid can be prepared from the appropriate pure sodium salts using the acidic ion exchange resin: for example, AMBERLITE® 120H from Rohm and Haas, Philadelphia, Pa. An aqueous solution of the appropriate salt is passed through an ion exchange column containing AMBERLITE® 120H, at which time almost all the sodium ions are removed leaving the pure acid. The acidity of the prepared acid will depend on whether all the sodium ions are removed. Thus not all the sodium must be removed to prepare the flame retardants of the invention. The most preferred for strong acids is pH less than 1.0. Addition of ion exchange resin via a batch method does not remove all the sodium ions unless repeated a few time. It is preferred to use an ion exchange column to remove nearly all the sodium ions. The batch method is very convenient in a laboratory setting making compounds on a small scale, but sodium ions are less likely to be removed.

The molar unit for pyrophosphoric acid is $H_4P_2O_7$. The molar unit for polyphosphoric acid is assumed to be $(HPO_3)$ in this work with the molecular weight assumed to be derived from $(HPO_3)$. With there being 3 or more units in a polymeric chain, the true molecular weight could be quite large as n molar units are involved with a terminal (OH) group. Such considerations are used to determine the correct reaction ratios. For all polyphosphoric acid calculations, the molecular weight will be based on the unit ($HPO_3$) even though that is only an approximate molecular weight.

Polyphosphoric acid, a commercially available form, can also be prepared by heating $H_3PO_4$ with sufficient phosphoric anhydride to give the resulting product, an 82–85% $P_2O_5$ content, as described in the *Merck Index* 10$^{th}$ edition, #7453. Such a polyphosphoric acid can be obtained from Aldrich Chemical and is used in several of our examples. Meta phosphoric acid can be purchased from Aldrich Chemical, Milwaukee, Wis. and is defined as $(HPO_3)_n$. The actual number of n units in a polymeric chain is not given.

Formaldehyde can be purchased as an aqueous solution, which contains stabilizers. Paraformaldehyde has been used as our source of formaldehyde in order to avoid stabilizers. Either should be a usable source of formaldehyde.

Examples of suitable amine compounds are urea, substituted akyl ureas, thiourea, akyl thiourea, cyanamide, ethylenediurea, aniline, ethyleneamines, dicyandiamide, guanidine, guanamine, benzoguanamine, acetoguanamine, glycoluril, acrylamide, methacrylamide, melamine, benzene sulfonamide, naphthalene sulfonamide, toluene sulfonamide, ammeline, ammelide, guanazole, phenylguanazole, carbamoylguanazole, dihydroxyethyleneurea, ethyleneurea, propylene urea, melem ($C_6H_6N_{10}$), melam ($C_6H_9N_{11}$), octadecylamide, glycine, and their mixtures. The preferred amine is melamine.

Flame retardants are generally added to materials so that the material passes a particular flame retardance test. The test dictates the level of flame retardance and thus the level of addition. Many considerations are application dependent.

A best practice can not be formulated beforehand for all polymers. Polymers decompose at different temperatures thus requiring the flame retardant agent to be chosen with that information in hand. Polypropylene with little inherent char formation will flame retard differently than a polyester or a polyamide. Polymers within these families can behave very differently. Thermosets may have low processing temperatures allowing use of flame retardant compositions that would decompose in an extruder. Examples have been chosen to demonstrate the breadth of flame retardants that can be synthesized.

The reaction products of the invention especially the ones involving polyphosphates can be quite soluble. Thus, they are recovered by evaporation techniques. In our applications, we used a vacuum oven to remove the solvent, which is usually water. Another technique is to place the solution containing the product on a hot plate and then use a blow dryer to blow hot air on the solution to remove the water. The pasty product is further dried in an oven with or without vacuum. For large scale production, commercially available equipment such as evaporators with scrubbers could be used. The only requirements are that the technique not substantially degrade the reaction product by drying too long at elevated temperature and that some mixing occur as the evaporation proceeds as there is often further reaction occurring during the solvent removal stage.

For some applications such as thermosets or low melting polymers subjected to temperatures substantially less than 200° C., the preferred practice is to use EDA or DETA, the amine to be melamine, and the acid to be polyphosphate. For each mole of polyphosphoric acid, the preferred composition is 0.2 to 0.31 moles of melamine, at least 0.09 but less than 0.32 moles of formaldehyde, and at least 0.3 but less than 0.6 moles of EDA or DETA. Part of the best practice is to react melamine and formaldehyde fully and then add EDA and then react with the acid. The reaction product is extracted by evaporation as it is partially soluble. A more stable product is formed if vacuum is used during drying which strongly suggests a condensation occurring during vacuum drying. The resinous type reaction product darkens as the water is extracted which is very different behavior than the best practice reaction products of PCT/US01/09514. This reaction product is resinous and partially dissolves when mixed into polymer melts making it a very effective flame retardant. The resinous behavior that enables mixing readily into polymer melts was unexpected, as compared to the best practice compounds in PCT/US01/09514. The best practice is to prepare such resinous compounds although our invention encompasses compounds that are not resinous. Use of DETA, TETA, and higher EDA analogues will yield more stable compounds than EDA but at additional cost. Compositions without melamine are more soluble in the polymer and are more likely to form polymeric compositions that are spinnable into fibers. Melamine addition tends to form some particulate within the resin.

The most preferred practice is to form the reaction product of DETA or TETA with polyphosphoric acid, with the polyphosphoric acid obtained via ion exchange a little more preferred. The preferred ratio of acid to ethyleneamine is chosen so that the pH of the resultant flame retardant composition is about 3.5 to 6.5, with 4 to 6 being most preferred. Such a product is much more stable than EDAP, as shown by heating in a vacuum oven for 30 minutes at 200° C. For flame retarding solid thermoplastic objects, addition of compounds such as melamine, melamine phosphate, or melamine pyrophosphate (MPP) with the DETA/polyphosphoric reaction product is preferred. It is preferred to add about one to three parts MPP with two parts of the DETA/polyphosphoric reaction product. For polypropylene, about a 30% total loading is preferred to obtain UL94 V0 classification in flame retardance testing. One part MPP with two parts DETA/polyphosphoric reaction product is most preferred for flame retarded polypropylene solid objects. Another part of the best practice for solid thermoplastic objects is to add an anti drip agent at a loading of 0.1 to 2%, with 0.25 to 1.0% most preferred.

For fiber and thin film applications the most preferred is to omit the addition MPP and anti drip agent and simply add the DETA/polyphosphoric reaction product with appropriate processing aids to the polymer being flame retarded.

Ethyleneamines are often made from an industrial method based on ethylene and ammonia, according to *Encyclopedia of Chemical Technology*, Volume 8, page 82. A typical product distribution is EDA 55%, piperazine (PIP) 1.9%, DETA 23%, amino ethylpiperazine (AEP) 3.5%, TETA 9.9%, TEPA 3.9%, and higher ethyleneamines 2.3%. Other methods for synthesis of ethyleneamines also give similar distributions of the ethyleneamines. All the commercial methods synthesize all ethyleneamines at same time, thus requiring separation. The least expensive method to make one of the flame retardants is to use this mixture of ethyleneamines directly or just the fraction with a boiling point greater than EDA, for example. This will eliminate the costly step of separation and packaging of ethyleneamines into specific chemicals, which are then individually reacted with the acids, amines and formaldehyde. The work here shows that it is advantageous to use the higher molecular weight ethyleneamine if higher thermal stability is desired.

The flame retardants can be added to synthetic polymers, both thermoplastic and thermoset as well as polymeric coatings and paints. The field of applicability is not limited. The applicable thermoplastic polymers should have a melting point or substantial softening point greater than room temperature. Some polymers soften at temperatures well below their melt point and can be processed at the softening temperature.

Flame retardant containing polymer compositions can be prepared conventionally in a melt mixer such as a Brabender mixer, a single screw extruder, a twin screw extruder, or any other such devise that melts polymer and allows addition of additives. A Brabender, Buss Kneader or Farrell mixer will be preferred for polymers with poor thermal behavior. An extruder is often used for more stable polymers with high melt point.

The flame retardant containing polymer composition may contain other additives such as other flame retardants, standard carbon forming compounds, and re-enforcing agents, a partial list being chopped glass, aramid fibers, talc, mica, nano-clay, or clay. Since flame retardants work by different mechanisms, a combination of our flame retardant with other flame retardants may perform more efficiently. Other additives include such ingredients as stabilizers, release agents, flow agents, dispersants, plasticizers, and pigments.

The heat treatment makes the compounds more thermally stable and can usually create a more hydrophobic surface as indicated by decreasing solubility in water. Some applications requiring higher thermal stability or low solubility may use a flame retardant of the invention that has been heat treated. The preferred heat treatment is any temperature less than 340° C. for less than 360 minutes, which includes zero minutes of heat treatment after drying. Heating with vacuum is most preferred. Heat treatment at temperatures less than 360° C. can be done in various methods and may include vacuum. Any method whereby the heat is applied somewhat uniformly to all the particles is important. Standard ovens and fluidized beds are other examples.

Because the flame retardants can absorb water, it may be advantageous to pellitize and coat with a water insoluble coating. Such a coating with or without pellitizing will decrease water absorption and make it easier to use.

The flame retardants can be resinous depending upon the composition. These resinous flame retardants can mix into polymers and reduce the viscosity and thus the processing temperature and thereby serve as processing aids at low concentrations. In such situations, the lower processing temperature could allow addition of other flame retardants such as EDAP.

The range of application of the flame retardants can be enlarged by decreasing the particle size by milling in a monomer or solvent. The milled compound in the monomer can then be added to the method for making the polymers containing that monomer and thereby making a polymeric composition that comprises a flame retardant. Examples include thermoplastic and thermoset polymers such as polyesters, polyamides, polyolefins, polyurethanes, and their co-polymers. Thermosets for electronic packaging are often prepared from a solvent solution with the solvent being organics such as the ketones (methylethyl ketone). Electronic packaging involves multilayer films and adhesives, with the total package required to pass particular flame retardant tests. Our flame retardants milled a solvent, where the flame retardant is insoluble, could be added to the thermoset solution and then cured in standard fashion.

The classes of polymers to which the flame retardants are applicable include the following: acrylic, butyl, cellulosics, epoxy, furan, melarnine, neoprene, nitrile, nitrocellulose, phenolic, polyamide, polyester, polyether, polyolefin, polysulfide, polyurethane, polyvinyl butyral, silicone, styrene-butadiene, butyl rubber, and vinyl.

Polymer and polymer compositions to which the flame retardants of the invention are applicable to include the following:

1. Mono and diolefins such as polypropylene (PP), thermoplastic olefins (TPO), polyisobutylene, polymethylpentene, polyisoprene, polybutadiene, polyethylene with or without crosslinking, highdensity polyethylene, low density polyethylene, or mixtures of these polymers. Copolymers of mono and diolefins including other vinyl momomers such as ethylene-propylene copolymers, ethylene-vinyl acetate copolymers. Terpolymers of ethylene with propylene and a diene such as hexadiene, cyclopentadiene or ethylidiene norborene and vinyl monomers such as vinyl acetate. Mixtures of polymers under 1.
2. Polystyrene, poly p methyl styrene, poly α methylstyrene, and copolymers of styrene or α methylstyrene with dienes or acryl derivatives such as styrene-butadiene, styrene-actrylonitrile, styrene-alkylmethylacrylate, styrene-butadiene-akylacrylate, styrene-maleic anhydride, and styrene-acrylonitrile-methylacrylate.
3. Polyphenylene oxide and polyphenylene sulfide and their mixtures with styrene polymers or with polyamides.
4. Polyurethanes derived from polyethers, polyesters and polybutadiene with terminal hydroxy groups on one hand and aliphatic or aromatic polyisocyanates on the other as well as their precursors.
5. Polyamides and copolymers derived from diamines and dicarboxylic acids and/or from aminocarboxylic acids or the corresponding lactams, such as polyamide 4, polyamide 6, polyamide 6/6, 6/10, 6/12, 4/6, 66/6, 6/66, polyamide 11, polyamide 12, aromatic polyamides based on aromatic diamine and adipic acid: and iso- and/or terephthalic acid and optionally an elastomer as modifier, for example poly-2,4-trimethyl hexamethylene terephthalamide, poly m phenylene-isophthalamide.
6. Polyesters derived from dicarboxylic acids and dialcohols and/or from hydrocarboxylic acids or the corresponding lactones such as polyethylene terephthalate, polybutylene terephthalate, polyethylene terephthalate/polybutylene terephthalate mixtures, polyethylene terephthalate/polybutylene terephthalate copolymers, poyl 1,4-dimethyl clclohexane terephthalate, polyhydroxybenzoates, and co-polymers with ethylene.
7. Polyvinyl chloride and copolymers with ethylene, copolymers of tetra fluro ethylene and ethylene.
8. Thermoset polymers include for example unsaturated polyester resins, saturated polyesters, alkyd resins, amino resins, phenol resins, epoxy resins, diallyl phthalate resins, as well as polyacrylates and polyethers containing one or more of these polymers and a crosslinking agent. A review of thermosets is found in Ullmann's *Encyclopedia of Industrial Chemistry*, Vol A26, p 665
9. Polymers for insulation such as fluorinated ethylene-propylene (FEP), cross linked polyethylene (XLPE), ethylene-propylene rubber (EPR), tree cross linked polyethylene (TRXLPE), and ethylene vinyl acetate (EVA).
10. Cellulose acetate, flexible polyurethane, rigid polyurethane.
11. Fluoropolymers and co-polymers such as TEFZEL®, DuPont Co, Wilmington, Del. Elastomers such as spandex as defined in *Encyclopedia of Chemical Technology*. Polyimides such as KAPTON®, DuPont Co., Wilmington, Del. And defined in *Encyclopedia of Chemical Technology*.
12. Polyethylene and its co-polymers.
13. Ethylene vinyl acetate, ethylene vinyl acetate carbon monoxide and ethylene n butyl acrylate carbon monoxide and ethylene n butyl acrylate glycidyl methacrylate, ethylene methyl, ethyl, and butyl acrylate ethylene (methyl, ethyl, buthyl) acrylate-vinyltrimethylsilane, or vinyltriethylsilane ethylene methyl acrylate and ethylene methyl acrylate MAME, ethylene acrylic and methacrylic acid, ethylene acrylic and methacrylic acid ionomers (Zn, Na, Li, Mg), maleic anhydride grafted polymers.

Melamine pyrophosphate and mono, di-, or tri-pentaerythritol are commonly used together (see U.S. Pat. No. 3,914,193) with a film forming latex of a poly(vinyl ester) to form an intumescent latex coating composition or intumescent paint or could be used to make latex backing for carpets. Such latex's can be in aqueous or alcohol mediums. An improvement is to use the self intumescing reaction products of the invention with the latex binder to form coatings or paints that are flame retardant coatings. A usable coating can contain one or more of the other ingredients such as potassium tripolyphosphate, ethhoxylated castor oil, waxy-fatty ester de-foamer, chlorinated paraffin, $TiO_2$, and hydroxy ethyl cellulose which are normally ingredients in flame retardant paints. One skilled in the art of coatings can easily add the correct combinations to get proper physical behavior of a coating or carpet backing with the compounds of the invention.

The materials of the invention have value for flame retarding articles, films, and fibers.

Abbreviations Used in Examples

Mel—melamine, PF—paraformaldehyde, ID#—sample identification, PA—phosphoric acid of 85% concentration, meta—metaphosphoric acid, SAPP—sodium acid pyrophosphate, HEX—sodium polyphosphoric acid, teta—triethylene tetramine, deta—diethylene triamine, eda—ethylene diamine, EDA123 is equal parts EDA, DETA, TETA. Dicy is dicyandiamide. POPP is polyphosphoric acid from Aldrich Chemical.

Sources of Materials:

Melamine was obtained from DSM Corp., Saddlebrook, N.J.

PCS Inc., Newark, N.J. for 85% concentration phosphoric acid.

Paraformaldehyde, meta-phosphoric acid, polyphosphoric acid, sodium acid pyrophosphate, sodium polyphosphoric acid, DETA, TETA, and EDA were obtained from Aldrich Chemical, Milwauke, Wis.

CYMEL® resins were obtained from Cytek Industries, West Patterson, N.J.

FR150 from Shamrock Technology, Newark, N.J.

EXAMPLES

All of the ingredients for the examples demonstrating some of the reaction products of the invention are listed in first nine tables in grams and a similar experimental procedure was usually followed. Abbreviations used in the table are listed above. The first entry in the tables is always the sample ID. The amount in grams of the amine, paraformaldehyde, water, ethyleneamine, and phosphoric acid (85% concentration) are the first five entries after the sample designation. Step 1 was to prepare methylolated amine by heating the amine, paraformaldehyde, and water to a temperature near boiling. The amounts of these ingredients and temperature were chosen so that a clear solution was obtained and as concentrated as practically possible. The second step was to add the EDA or ethyleneamine to the hot methylol amine solution. The resultant solution was then added to the phosphoric acid rapidly to form a resinous final product. Nearly all the tables have a column labeled foam which designates the level of intumescent char that forms when heated in an oven at 500° C. The pH of a 10% aqueous dispersion/solution was listed in the last column for some samples.

A typical demonstration is sample 24c in Table I. First, 3.15 g of melamine, 2.5 g of paraformaldehyde, and 3.15 g of water was mixed in a glass beaker and then heated to boiling for a few minutes with formation of a clear solution of methylolated melamine. Then, 3.8 g of diethylenetriamine (DETA) was added drop wise. Strong bubbling occurred and some reaction was obvious. The methylolated melamine-DETA solution was added quickly with vigorous stirring to 11.4 g of phosphoric acid 85%. This was done before the methylolated melamine-DETA solution started to precipitate. An orange colored solution formed with much bubbling which turned into a solid mass which is obviously a resinous material. The yield of solid mass was about 20.2 g, whereas the weight of the initial ingredients was about 24 g.

Numerous samples are shown in Table I prepared in similar fashion. It appears desirable to run the reaction with as little water as possible so as to enable easier drying. Samples 8c and 9c in Table I were run as above except for the absence of methylol melamine. The product was very different in that it has the form of crumbs, not a resin. The color was also very different in that it was not a shade of orange. It appears that the DETA salt of phosphoric acid was prepared as expected and is a compound of the invention. Its intumescence was less as compared to sample 24c.

TABLE I

The reaction product of diethylenetriamine and methylol melamine with phosphoric acid 85%.

| ID# | Mel | PF | H2O | DETA | PA | initial weight | yield | int char | pH |
|---|---|---|---|---|---|---|---|---|---|
| 8c | 0 | 0 | 0 | 7.6 | 8.5 | | | | |
| 9c | 0 | 0 | 0 | 3.8 | 8.5 | | | | 5.38 |
| 10c | 3.15 | 1 | 15 | 3.8 | 8.5 | | | | 5.9 |
| 11c | 3.15 | 2 | 5.4 | 3.8 | 8.5 | | | | |
| 12c | 3.15 | 2 | 5.4 | 3.8 | 8.5 | | | | |
| 13c | 3.15 | 3 | 5.4 | 3.8 | 8.5 | | | | |
| 13c-b | 3.15 | 3 | 5.4 | 3.8 | 8.5 | | | | |
| 14c | 3.15 | 3 | 4.1 | 3.8 | 8.5 | | | | |
| 15c | 3.15 | 2.5 | 4.1 | 3.8 | 8.5 | | | | |
| 16c | 3.15 | 2.5 | 4.1 | 3.8 | 8.5 | | | | |
| 16c-b | 3.15 | 2.5 | 4.1 | 3.8 | 3.04 | | | | |
| 17c | 3.15 | 2.5 | 4.1 | 0 | 3 | | | | |
| 18c | 3.15 | 2.5 | 4.1 | 3.8 | 10 | | | | 3.92 |
| 19c | 3.15 | 2.5 | 4.1 | 3.8 | 11.4 | | | | 3.64 |
| 20c | 3.15 | 2.5 | 4.1 | 7.6 | 11.4 | | | | |
| 21c | 3.15 | 3 | 4.1 | 3.8 | 11.4 | 25.5 | 21.5 | good | |
| 22c | 3.15 | 2 | 4.1 | 3.8 | 11.4 | 24.5 | 20.8 | good | |
| 23c | 3.15 | 2.5 | 4.1 | 3.8 | 11.4 | 25 | 21.4 | good | |
| 24c | 3.15 | 2.5 | 3.15 | 3.8 | 11.4 | 24 | 20.2 | good | |
| 25c | 3.15 | 3 | 6.1 | 3.8 | 11.4 | 27.5 | 22.2 | good | |

Flame retardant capability of sample 24c was tested by mixing with powdered polyethylene, a polymer known to be difficult to flame retard because of its negligible char. Sample 24c and powdered polyethylene were ground together with a mortar and pestle at a ratio of 35% sample 24c, 65% polyethylene. The mixture was then mixed on a hot plate set at 235° C. with two spatula's for about 5 minutes. The melted mass was shaped into a film about 0.24 inches thick. The film was subjected to a small BIC® cigarette lighter for 60 seconds, the film held vertically and the flame applied at the bottom. The polyethylene film extinguished within a few seconds after the flame was removed with no dripping, indicating that sample 24c is a very effective flame retardant. No dripping indicates strong charring. A comparable control sample made from polyethylene polymer burns substantially and drips when subjected to same flame for 60 seconds. Similar results were found for other samples prepared with 21C, 22c, 23c, and 25c from Table I. Samples 8c and 9c have flame retardant activity but appear to flame a longer time and there was some undesirable dripping when the flame is applied for 60 seconds.

Ethylene diamine (EDA) has a lower boiling point than DETA. In Table II, the reaction products of EDA and methylol melamine with phosphoric acid 85% are shown. The same procedure as in Table I was followed. First methylol melamine was formed, then EDA was added. Next, the EDA/methylol melamine was added to phosphoric acid rapidly. A resinous mass formed with orange like color. The flame retardant characteristics were investigated as with sample 24c above. Sample 2e was dried, ground, then added to powdered polyethylene via heating on a hot plate at 35% loading. The flame retarded polyethylene when subjected to a cigarette lighter flame for 60 seconds extinguished shortly after the flame was removed and did not drip. Considerable charring was observed. A control sample burns substantially after the flame is removed and drips while the flame is applied.

A similar experiment was repeated with sample 1e except the polymer was ethylene vinyl acetate (EVA) co-polymer, that contains 18% vinyl acetate monomer and melts at about 90° C. The flame retarded polymer stopped burning shortly after the flame was removed with good charring as observed above with polyethylene. A control EVA was fully ignited by the same 60 second burn with much dripping.

TABLE II

The reaction product of ethylene diamine and methylol melamine with phosphoric acid.

|  | Mel | PF | H2O | EDA | PA | yield | initial weight | char |
|---|---|---|---|---|---|---|---|---|
| 1e | 3.15 | 2.5 | 4 | 3.8 | 11.4 | 19.7 | 24.9 | good |
| 2e | 3.15 | 2.5 | 4 | 2.5 | 11.4 | 18.8 | 23.6 | good |

Flame retardants similar to that of Table I and Table II can be more easily prepared by utilizing commercially prepared methylol melamine resins from Cytek Industries, West Patterson, N.J., the trade name being CYMEL®. The advantage of these resins is that the concentration is much higher at about 80%, less water or solvent to remove, and the CYMEL® resins are partially methylated so that stability is not an issue. The methylol melamines used in Table I and Table II will precipitate if cooled and allowed to stand, a disadvantage compared to the CYMEL® resins. In Table III, the resins used are CYMEL® 373 and CYMEL® 385 which are aqueous based. Numerous solvent based CYMEL® resins are available and would be suitable as well. All the samples in Table III were prepared by adding DETA drop wise to the appropriate amount of CYMEL® 373 or CYMEL® 385 and heating to about 85° C.–100° C. This solution was then added rapidly to the appropriate amount of phosphoric acid that had been also heated to about 85° C. The reaction rate was slower than that found for the preparations in Table I, but the final product appears to be the same resinous mass. A sample was tested for flame retardance by mixing into powdered polyethylene on a hot plate, following procedures outlined above. Good flame retardant behavior was observed as with sample 24c above for both CYMEL® resins.

TABLE III

The reaction product of Cytek methylol melamine resins with DETA and phosphoric acid.

| Sample # | CYMEL® | | | DETA | | PA | | | Char | pH |
|---|---|---|---|---|---|---|---|---|---|---|
| 5b-373 | 7 | 0 | 0 | 5.2 | 0 | 8.9 | 0 | 0 | 0 | |
| 6b-373 | 7.28 | 0 | 0 | 5.27 | 0 | 8.7 | 0 | 0 | 0 | |
| 7b-373 | 7.53 | 0 | 0 | 5.24 | 0 | 8.79 | 0 | 0 | 0 | |
| 8b-373 | 7.13 | 0 | 0 | 5.36 | 0 | 8.59 | 0 | 0 | 0 | |
| 9b-373 | 8.3 | 0 | 0 | 4.04 | 0 | 8.78 | 0 | 0 | 4.2 | 4.2 |
| 10b-373 | 4.5 | 0 | 0 | 6 | 0 | 8.75 | 0 | 0 | 0 | |
| 11b-373 | 4.5 | 0 | 0 | 3.8 | 0 | 8.5 | 0 | 0 | 4.9 | 4.8 |
| 2b-385 | 9.5 | 0 | 0 | 5.2 | 0 | 8.5 | 0 | 0 | 0 | |
| 3b-385 | 9.5 | 0 | 0 | 5.2 | 0 | 8.5 | 0 | 0 | 0 | |
| 1b-385 | 3.15 | 1 | 0 | 5.2 | 0 | 8.5 | 0 | 0 | 0 | |

A different type of product results if methylolated ethyleneamine was mixed with ethyleneamine, which was then added rapidly to phosphoric acid. The reaction product was not a salt but a resin. In Table IV, the reaction products of DETA and methylol DETA with phosphoric acid are shown. The same procedure as in Table I was followed. First methylol DETA was formed by adding PF to DETA which may or may not contain water. Then DETA was added to the methylolated DETA. Next, the DETA/methylol DETA was added to phosphoric acid rapidly. A resinous mass formed with orange like color after the remaining water was extracted from the reaction product. The reaction product pours if heated. This compound is necessarily a flame retardant as it contains phosphates and amines. This flame retardant could have advantages in applications where a viscous material is necessary as the flame retardant.

TABLE IV

The reaction product of methylolated DETA and DETA with phosphoric acid.

|  | DEta | PF | H2O | DETA | PA | char |
|---|---|---|---|---|---|---|
| 26c | 1 | 2 | 1.15 | 2.8 | 8.4 | good |
| 27c | 1 | 1.3 | 0 | 2.84 | 8.4 | good |
| 28c | 1 | 0.8 | 0 | 2.8 | 8.4 | good |

In Table V, a scheme is presented by which compositions are chosen. CYMEL® 385 is about 80% resin, with about 3.2 formaldehyde molecules per melamine to estimate it's molecular weight. The ingredients CYMEL®, phosphoric acid (pa), and DETA or TETA have been chosen to obtain the nominal compositions shown in the table. Example 385-d6 has ingredients chosen so that the composition is 1 molecule of mp per one molecule of DETA-pa1.8. Example 385-t2 has 1.5 molecules of mp per one molecule of TETA-pa2. The pH of the resultant resin products are also shown. These choices of composition appear to give good color and flame retardant properties when mixed into ethylene vinyl acetate, as compared to less systematic choices in tables above.

TABLE V

Reaction product of CYMEL ® 385 and DETA or TETA with phosphoric acid.

| CYMEL ®-385 | pa | composition | | pH |
|---|---|---|---|---|
| | | DETA | | |
| 385-d6 | 7.07 | 2.88 | 2.57 mp:dp1.8 | 3 |
| 385-d7 | 7.07 | 2.88 | 3.86 mp:1.5(dp1.8) | 3.4 |
| 385-d8 | 7.07 | 2.88 | 5.15 mp:2(dp1.8) | |
| 385-d9 | 7.07 | 2.88 | 2.57 mp:dp1.6 | 3.04 |
| 385-d10 | 7.07 | 2.88 | 3.86 mp:1.5(dp1.6) | 3.66 |
| 385-d11 | 7.07 | 2.88 | 5.15 mp:2(dp1.6) | 4.67 |
| | | TETA | | |
| 385-t1 | 7.07 | 2.88 | 3.65 mp:tp2 | 2.8 |
| 385-t2 | 10.60 | 4.32 | 3.65 1.5(mp):tp2 | 3 |
| 385-t3 | 14.14 | 5.76 | 3.65 2(mp):tp2 | |
| 385-t4 | 7.07 | 2.88 | 5.48 mp:1.5(tp2) | 3.9 |
| 385-t5 | 7.07 | 2.88 | 7.31 mp:2(tp2) | 5 |

A simple test of intumescense is to heat approximately 0.5 g of a flame retardant in an oven at about 500° C. for about two minutes. Samples 24c, 1e, and 2e were found to form a foam that is at least 50 times larger than the original material when heated at 500° C. Samples 26c, 27c, and 28c foam about one half as much as samples 24c, 1e, and 2e when heated at 500° C. Actual tests would be needed to determine which flame retardant was the most effective for a given situation. The intumescent effect is only one of the important factors in determining the efficiency of flame retardants.

Next, experimental data is presented on the preparation of ethyleneamine phosphates which have stability superior to that of ethylene diamine phosphate (EDAP). The most stable product was obtained by the reaction of polyphosphoric acid (popp) with EDA, DETA, or TETA. Several experiments are summarized in Table VI along with the pH and the weight loss at 300° C. All experiments follow the same procedure. For example, Popp-E2 was prepared by first heating 24 g of popp so that it stirs easily. Then, 18 grams of EDA was added and stirred in rapidly. Much of the EDA was vaporized. Enough EDA was reacted to give the reaction product with various pH values depending on how rapidly the EDA was added. A similar procedure was followed for reaction of popp with DETA and TETA.

These compounds could have excellent flame retardant properties because of good thermal stability. On a hotplate at 200° C., ethylene vinyl acetate and sample popp-E2 were mixed at a 35% loading. A film of this mixture did not sustain burning when ignited with a cigarette lighter.

TABLE VI

The reaction product of EDA, DETA, and TETA with polyphosphoric acid (popp).

| | popp | pH | | TGA |
|---|---|---|---|---|
| EDA | | | | |
| Popp-E1 | 4.5 | 6 | | weight loss at 300° C. less than 1% |
| Popp-E2 | 18 | 24 | 2.02 | weight loss at 300° C. less than 1% |
| Popp-E3 | 4.6 | 6.2 | 5.73 | weight loss at 300° C. less than 6% |
| Popp-E4 | 4.95 | 6 | 5.52 | |
| Popp-E5 | 4.3 | 6.15 | 3.88 | |
| Popp-E6 | 4.5 | 6 | | |
| DETA | | | | |
| Popp-E1 | 5.15 | 8 | | weight loss at 300° C. less than 3% |
| Popp-D2 | 5.15 | 8 | | |
| Popp-D3 | 5.66 | 8 | | |
| Popp-D4 | 6.18 | 8 | | |
| Popp-D5 | 5.15 | 8 | | |
| TETA | | | | |
| Popp-T1 | 3.65 | 6 | 2.2 | weight loss at 300° C. less than 3% |
| Popp-T2 | 4.01 | 6 | | |
| Popp-T3 | 4.38 | 6 | | |
| Popp-T4 | 3.65 | 6 | | |

Polyphosphoric acid is quite expensive compared to sodium polyphosphate, available from Tilley Chemical Corp., Baltimore, Md. Polyphosphoric acid can be made by dissolving sodium polyphosphate in water and then extracting the sodium ions with an ion-exchange resin (AMBERLITE® 120 from Aldrich Chemical) to form polyphosphoric acid.

In Table VII, the reaction of ethyleneamines with polyphosphoric acid was found. The polyphosphoric acid was prepared by adding 223 g of ion exchange resin AMBERLITE® 120, 103 g of water, and 50 g of sodium polyphosphate to a beaker and then heating and stirring for about 10 minutes at which time the pH of resultant acid was about 0.9. Next, the resin was filtered, then washed with about 43 g of water and filtered and collected with the acid. About 178 g of acid was collected. For the experiments in Table VII, about 30 g of acid was put in a beaker that was heated and stirred. Then EDA was added to the desired pH. Four runs were made and the pH's were 7.86, 5.63, 5.56, and 6.14 in Table VII. The product was obtained by placing the solution in a vac oven at about 85° C. to extract the water and obtain the product. Similar procedure was followed for DETA (samples poly-D1, Poly-D2) and TETA (Poly-T1). The pH of the products are shown in the table. Good flame retardant behavior was assured because of high phosphorous content and good thermal stability. Loading by weight of 35% in ethylene vinyl acetate showed very good flame resistance. The method of removing sodium ions is not very good when using a batch method and the solution is quite concentrated.

TABLE VII

Reaction Product of Ethyleneamines with Poly-Phosphoric acid.

| | pH-solution | pH-product | | 50 g sapp, 103 h2o, 43wash, 223ixr pH = .9 |
|---|---|---|---|---|
| Poly-E1 | 7.86 | EDA add | 5.6 | |
| Poly-E2 | 5.63 | EDA add | 5 | weight loss at 300° C. less than 6% |
| Poly-E3 | 5.56 | EDA add | 4.83 | weight loss at 300° C. less than 4% |
| Poly-E4 | 6.14 | EDA add | 5.18 | |
| Poly-D1 | 5.35 | DETA add | 4.36 | |
| Poly-D2 | 5.45 | DETA add | 5.1 | weight loss at 300° C. less than 5% |
| Poly-T1 | 5 | TETA add | 3.9 | |

Instead of using an ion exchange resin to prepare polyphosphoric acid, polyphosphoric acid from Aldrich chemical was reacted with ethyleneamines. For the examples in Table VIII, water (listed in grams) was mixed with an equal weight of polyphosphoric acid. EDA and ethyleneamines (deta, or teta) was added slowly to the popp solution until a pH approximately between 4 and 7 is reached. Values of pH outside this range would be suitable for situations that high acidity or basicity was allowable. The solution was then dried in a vacuum oven and the pH of 10% solutions is given in Table VIII. These compounds are shown to be more stable than edap when heated in an oven set at 250° C. The samples 1,2, and 3 loose weight much less rapidly than EDAP. Samples 1,2, and 3 were also mixed on a hot plate set 230° C. with polypropylene at a 35% concentration. Films prepared in such a manner were resistant to burning. Thus, compounds such as 1,2 and 3 have the requirements of a suitable flame retardant for olefins. Such salts are expected to have better flame retardant performance as the greater phosphoric content will give improved charring properties.

TABLE VIII

Reaction Product of Ethyleneamines with Polyphosphoric acid.

|   | popp | H2O | pH 10% concern. |
|---|---|---|---|
| 1 teta | 26 | 26 | 5.5 |
| 2 deta | 27 | 27 | 5.6 |
| 3 eda | 29 | 29 | 6.3 |

In examples in previous tables, ethyleneamine reacted directly with 85% concentration reacted very vigorously which might be undesirable as some ethyleneamine may be vaporizing. In Table IX, water was added to the 85% phosphoric acid (PA) and then ethyleneamine was added slowly to the resultant acid. The amine was added so that the pH is in the range of 4–7, but pH outside this range is acceptable. The samples were dried in a vacuum oven and the pH of the resultant product are shown. The samples 5 and 6 were also more stable than EDAP when heated in an oven at 250° C. Films prepared by mixing samples 5 and 6 with polypropylene on a hot plate at a 35% concentration had good flame retardant properties.

TABLE IX

Reaction Product of Ethyleneamines with Phosphoric acid (all entries in grams).

|   | amine | H2O | PA | PH 10% concern. |
|---|---|---|---|---|
| 5 teta | 19.26 | 32 | 30 | 6.2 |
| 6 deta | 14.5 | 30 | 30 | 5.89 |

Polyphosphoric acid with little sodium was prepared by running a solution of sodium polyphosphate through an ion exchange column so that nearly all the sodium ions are removed. Specifically, the column contained 250 ml of ion exchange resin, AMBERLITE® 120 from Rhom and Haas, Philadelphia, Pa. The solution was prepared by dissolving 30 g of sodium polyphosphate in about 165 g water with a little heat which was then fed through the column and the polyphosphoric acid collected. The column was operated in standard fashion. EDA was then reacted with the polyphosphoric acid until a pH of 4 to 8 is attained. About 9 g of EDA was reacted with the polyphosphoric acid to obtain the desired pH. The dilute EDA-polyphosphoric acid solution was then dried in a vac oven at about 100° C. to yield about 33 g of product (example Polyp-EDA). Pa-teta was prepared according to procedure for Table IX. Ppa 7R hex (1-2-3) was prepared by reacting freshly prepared polyphosphoric acid with a mixture of equal parts of EDA, DETA, and TETA, until a pH between 4–8 is obtained.

Sample ppa 10L EDA DICY was prepared by adding 1 g of dicyandiamide to freshly prepared polyphosphoric and then adding EDA until a pH of about 5.8 was obtained. Vacuum oven drying was used to extract the product.

All of our new compositions have stability at 250° C. that are much better than EDAP. This overcomes a major limitation of EDAP. Polyphosphoric acid-EDA yields a product that is more stable and thus preferable to EDAP. The phosphorous content of polyphosphoric acid-EDA compounds was also higher than that of EDAP which should lead to more efficient FR, provided all other things are the same. The reaction of TETA, which is a higher molecular weight EDA, with phosphoric acid (Pa-teta) also gives a higher stability product than EDAP and will lead to the desired goal of higher processing temperature.

The next set of runs (see Table X) were the result of interacting melamine, EDA, and formaldehyde in water and then adding to polyphosphoric acid in water. The polyphosphoric acid was prepared with an ion exchange column. First, about 60.3 g of sodium polyphosphate was dissolved in about 350 ml of water. The solution was then passed through an ion exchange column containing about 550 ml of AMBERLITE® 120 ion exchange resin to extract nearly all the sodium and form polyphosphoric acid. Water was used to purge the remaining polyphosphoric acid in the column. The yield of polyphosphoric acid in water was about 700 ml, with the actual polyphosphoric acid content about 48 g. In a second beaker, approximately 10 to 20 g of melamine, 2 to 3.5 g of paraformaldehyde, and about 16 g of EDA were added to 88 g of water. This was heated with stirring for about 10 minutes to a temperature less than or equal to boiling for full reaction. The amine solution was quickly added to the polyphosphoric acid solution with stirring and subsequent heating for a few minutes. The pH of the final mixture was adjusted to a pH from 4 to 7 which usually required addition of one to two grams of EDA. The mixture was placed on a hot plate and standard portable blow dryers were used to evaporate the water leaving a pasty mixture. The pasty mixture was placed in an oven to remove all water and giving a resinous product that darkens as it dries. The darkening of the product as the final moisture is removed is indicative of becoming a new composition that is obtained by the evaporation method. The resinous product breaks into pieces which can then be mixed into polymer melts via standard techniques: extruders, Brabenders, Buss kneaders, etc. This product partially dissolves when mixed into polymer melts resulting in very efficient flame retardance and good mechanical properties as compared to EDAP.

TABLE X

Reaction product of melamine, paraformaldehyde, and EDA pre-reacted in water and then added to polyphosphoric acid in water (entries in grams).

| ID# | M | PF | EDA | H2O | Hex |
|---|---|---|---|---|---|
| 1 | 14 | 3.5 | 18 | 88 | 60.3 |
| 2 | 15 | 3 | 17.3 | 88 | 60.2 |
| 3 | 13 | 3 | 17.3 | 88 | 60.3 |
| 4 | 11 | 3 | 17.3 | 88 | 60.3 |
| 5 | 12 | 3.5 | 18 | 88 | 60.3 |
| 6 | 12 | 2.5 | 16.8 | 88 | 60.2 |
| 7 | 12 | 3 | 18 | 88 | 60.3 |
| 8 | 10 | 3 | 17 | 88 | 60.2 |
| 9 | 14 | 3 | 17.7 | 88 | 60.3 |
| 10 | 20 | 2 | 17.6 | 88 | 60.3 |
| 11 | 14 | 2 | 18 | 88 | 60.2 |

The pH of the samples of Table X are about 4–7. As a particular example, use a Brabender to prepare a small sample. Set the Brabender at a temperature of 240° C. Add 36 g of standard extrusion grade polypropylene and mix for about 1.5 minutes until the polymer is melted. Then add 18 g of sample #1 from Table X and mix for 5 to 7 minutes. Make resultant product into bars 1/8 inch thick, 6 inch long, and 0.5 inch wide. The samples pass UL94 testing with a V0 rating.

Similar reactions can be made with pyrophosphoric acid and phosphoric acid. Sodium acid pyrophosphate, 60.5 g, was dissolved in 450 g of water and run through an ion exchange column to prepare pyrophosphoric acid. Separately, 14 g of melamine and 3 grams of paraformaldehyde was added to 88 g of water and heat for about 10 minutes to a temperature of 60° C. to 80° C. Then, 17 g of ethylene diamine was added to the melamine/pf solution and continued heating to get full reaction. Then, this basic solution was added to the pyrophosphoric acid and mixed with continued heating. About 1 g of EDA was added to adjust pH to about 5. Water was evaporated to extract the final product, which appeared to be resinous and darkened as vacuum dried.

For comparison, the EDA salt of pyrophosphoric acid was prepared. Pyrophosphoric acid was prepared as above by running a solution of sodium pyrophosphate through an ion exchange column. Then, 25 g of EDA was added to about 25 g of water and stirred. The EDA/water was added rapidly to the pyrophosphoric acid and heated to about 60° C. The water was evaporated to extract the product, which appeared to be crystalline and much easier to dry than the other compound of pyrophosphoric acid just prepared which contained formaldehyde.

Finally, a similar salt of phosphoric acid was prepared. First, 14 g of melamine and 3 grams of paraformaldehyde were added to 88 g of water and heated for about 10 minutes to a temperature of 60° C. to 80° C. Then, 17 g of ethylene diamine was added to the melamine/pf solution and continued heating to get full reaction. Then, this basic solution was added to 42 g of 85% concentration phosphoric acid and mixed with continued heating. The water was evaporated to extract the product, which seemed a mixture of crystalline-like and resinous-like consistency.

The preferred composition for applications requiring extrusion have been scaled up in a 22 L column. First, 2640 g of sodium polyphosphate was dissolved in 15.4 L of water. The solution was processed through the ion exchange column to obtain polyphosphoric acid. Separately, 616 g of melamine and 132 g of paraformaldehyde were added to 3872 g of water with heating and stirring to about 60° C. to 80° C. Then 748 g of EDA was added to 800 g of water and let react for few minutes. Next, the EDA/water was added to the melamine/pf mixture and heating continued to fully react. Next, the amine mixture was added to the polyphosphoric acid solution rapidly with stirring. The water was evaporated to yield a resinous, pasty product which was further dried in a vacuum oven. Next, the product was mixed with polypropylene pellets at a loading of 30% by weight. The mixture was compounded in a 25 mm Werner and Pfleiderer twin screw extruder with the barrel temperatures set at 180° C. and screw speed of 150 rps. The mixture was added to the extruder at the main feed throat to demonstrate good thermal behavior, especially as the extruder had a standard screw design to melt and mix the composition. The resultant composition is molded into tensile bars 1/8 inch thick and flex bars 1/16 inch thick. The bars have elongation greater than 15% and the flex bars pass UL94 testing with a V0 rating.

Another preferred composition for applications requiring extrusion was made with the 22 L column. First, 2640 g of sodium polyphosphate was dissolved in 15.4 L of water. The solution was processed through the ion exchange column to obtain polyphosphoric acid. The polyphosphoric acid solution was divided into three equal parts. Sample 5-1 was prepared by adding 320 ml of TETA to one third of the polyphosphoric acid solution. Sample 5-2 was prepared by adding 320 ml of DETA to one third of the polyphosphoric acid solution. Sample 5-3 was prepared by adding 200 ml of EDA and 100 ml of TETA to one third of the polyphosphoric acid solution. The water was evaporated for all three samples to yield a resinous, pasty products which were further dried in a vacuum oven. All three samples were found to be much more stable that EDAP when heated in a vacuum oven. The three samples all show substantial intumescense when heated with a propane torch.

A composition for extrusion was prepared by mixing together by weight 70% polypropylene pellets, 20% sample 5-2, and 10% melamine pyrophosphate. The mixture was compounded in a 25 mm Werner and Pfleiderer twin screw extruder with the barrel temperatures set at 180° C. and screw speed of 150 rps. The mixture was added to the extruder at the main feed throat to demonstrate good thermal behavior, especially as the extruder had a standard screw design to melt and mix the composition. The resultant composition is molded into tensile bars 1/8 inch thick and flex bars 1/16 inch thick. The bars have elongation of about 6% and the flex bars pass UL94 testing with a V0 rating. The presence of MPP apparently makes molding good quality bars easier.

Another composition was prepared by mixing together by weight 69% polypropylene pellets, 20% sample 5-2, 10% melamine, and 1% FR150. The same procedure was followed on 25 mm twin screw extruder. Molded bars gave an elongation of about 10% and the bars pass UL94 testing with a rating of V0 at 1/16 inch thickness. The presence of melamine also makes molding good quality bars easier.

Sodium polyphosphate, 60.5 g, was dissolved in 350 g of water. An ion exchange column was used to prepare polyphosphoric acid which was heated for about 10 minutes to a temperature of 60° C. to 80° C. Next, 26 g of tetra-ethylene pentamine (TEPA) was added to the polyphosphoric acid and mixed with continued heating. Water was evaporated to extract the final product, which appears to be resinous and transparent yellow color. When heated in a vacuum oven at 200° C., this product of polyphosphoric acid and TEPA is much more stable than EDAP.

The next examples of making the flame retardant compositions were carried out by addition of polyphosphoric acid from Aldrich Chemical to TETA diluted with water. For example, TETA was dissolved in 10 g of water. Then 10.6 g of polyphosphoric acid was added. The reaction proceeds vigorously and gives off much heat and vapor. The reaction product was dried in a vacuum oven directly, as not much water remained. More reactions were run utilizing 10 g $H_2O$, 10.8 g TETA, 18 g Polyphosphoric acid; 10 g $H_2O$, 10.3 g TETA, 17 g Polyphosphoric acid; 10 g $H_2O$, 10.9 g TETA, 13 g Polyphosphoric acid; 10 g $H_2O$, 10.4 g TETA, 16 g Polyphosphoric acid; and 10 g $H_2O$, 10.3 g TETA, 16.9 g Polyphosphoric acid. All six products were much more thermally stable than EDAP when heated at 250° C. in a vacuum oven. The above reactions could be done without water with proper control of heat.

In this example, a mixture of melamine polyphosphate with the TETA salt of polyphosphoric acid is prepared. First, add 5 grams of melamine to 30 g of water and heat to about 80° C. Then add about 18 g of polyphosphoric acid and react for about 15 minutes at which time some melamine polyphosphate will be made. Then, add TETA to bring the mixture to near neutral pH. React mixture fully. Then, dry in a vacuum oven. Other amines such as urea, guanidine, and dicyandiamide could be used in place of melamine.

Dow Chemical Company makes EDA and ethyleneamines consisting of mixtures with high boiling points that should work well according to the teaching of this patent. For example Dow Chemical sells a product called tetraethylenepentamine-UHP which is a mixture of four different pentamines and additional higher and lower molecular weight ethyleneamines and their analogues, all with similar boiling points including linear, branched and two cyclic pentamines.

Another high boiling point Dow product is heavy polyamine X (HPA-X) which is a complex mixture of linear, branched, and cyclic ethyleneamines, the structure of which can be deduced from the chemistry of manufacture and a knowledge of the structures present in TETA and TEPA.

We claimed:

1. A flame retardant composition prepared by a method of either (a) reacting ethylene diamine with polyphosphoric acid, or (b) reacting an ethyleneamine or a mixture of ethyleneamines with polyphosphoric acid;
   in which the ratio of the polyphosphoric acid to the ethylene diamine, the ethyleneamine, or the mixture of ethyleneamines is such that a 10% solution of the flame retardant composition in water has a pH of 2.02 to 6.5, and the ethyleneamine has three or more nitrogen atoms;
   in which the method additionally comprises the step of purifying the polyphosphoric acid by ion exchange.

2. The flame retardant composition of claim 1 in which in which the method comprises the step (a).

3. A flame retardant composition prepared by a method of reacting an ethyleneamine or a mixture of ethyleneamines with polyphosphoric acid;
   in which the ratio of the polyphosphoric acid to the ethyleneamine or the mixture of ethyleneamines is such that a 10% solution of the flame retardant composition in water has a pH of 2.02 to 6.5, and the ethyleneamine has three or more nitrogen atoms.

4. The flame retardant composition of claim 1 in which the method additionally comprises the step of heating the flame retardant composition at a temperature from about 60° C. to about 340° C. for less than 60 minutes under vacuum of less than 30 inches of Hg.

5. A flame retardant composition prepared by a method of either (a) reacting ethylene diamine with polyphosphoric acid, or (b) reacting an ethyleneamine or a mixture of ethyleneamines with an acid selected from the group consisting of phosphoric acid, polyphosphoric acid, pyrophosphoric acid, and mixtures thereof;
   in which the ratio of the acid or acid mixture to the ethylene diamine, the ethyleneamine, or the mixture of ethyleneamines is such that a 10% solution of the flame retardant composition in water has a pH of 2.02 to 6.5, and the ethyleneamine has three or more nitrogen atoms;
   in which the method additionally comprises the steps of pellitizing the flame retardant composition into particles of at least 30 microns in diameter on average.

6. A flame retardant containing composition comprising:
   a) 30 to 99.75 percent by weight of a polymer; and
   b) 0.25 to 70 percent by weight of a flame retardant,
   the flame retardant prepared by a method of either (a) reacting ethylene diamine with polyphosphoric acid, or (b) reacting an ethyleneamine or a mixture of ethyleneamines with polyphosphoric acid;
   in which the ratio of the polyphosphoric acid to the ethylene diamine, the ethyleneamine, or the mixture of ethyleneamines is such that a 10% solution of the flame retardant composition in water has a pH of 2.02 to 6.5, and the ethyleneamine has three or more nitrogen atoms;
   in which the method additionally comprises the step of purifying the polyphosphoric acid by ion exchange.

7. The flame retardant containing composition of claim 6 in which in which the method comprises the step (a).

8. A flame retardant containing composition comprising:
   a) 30 to 99.75 percent by weight of a polymer; and
   b) 0.25 to 70 percent by weight of a flame retardant,
   the flame retardant prepared by a method of either (a) reacting ethylene diamine with polyphosphoric acid, or (b) reacting an ethyleneamine or a mixture of ethyleneamines with an acid selected from the group consisting of phosphoric acid, polyphosphoric acid, pyrophosphoric acid, and mixtures thereof;
   in which the ratio of the acid or acid mixture to the ethylene diamine, the ethyleneamine, or the mixture of ethyleneamines is such that a 10% solution of the flame retardant composition in water has a pH of 2.02 to 6.5, and the ethyleneamine has three or more nitrogen atoms;
   in which the method additionally comprises the step of reacting the ethylene diamine with formaldehyde and melamine before reacting the ethylene diamine with the acid.

9. A flame retardant containing composition comprising:
   a) 30 to 99.75 percent by weight of a polymer; and
   0.25 to 70 percent by weight of a flame retardant,
   the flame retardant prepared by a method of reacting an ethyleneamine or a mixture of ethyleneamines with polyphosphoric acid;
   in which the ratio of the polyphosphoric acid to the ethyleneamine or the mixture of ethyleneamines is such that a 10% solution of the flame retardant composition in water has a pH of 2.02 to 6.5, and the ethyleneamine has three or more nitrogen atoms.

10. A flame retardant containing composition comprising:
    a) 30 to 99.75 percent by weight of a polymer; and
    b) 0.25 to 70 percent by weight of a flame retardant,
    the flame retardant prepared by a method of either (a) reacting ethylene diamine with polyphosphoric acid, or (b) reacting an ethyleneamine or a mixture of ethyleneamines with an acid selected from the group consisting of phosphoric acid, polyphosphoric acid, pyrophosphoric acid, and mixtures thereof;
    in which the ratio of the acid or acid mixture to the ethylene diamine, the ethyleneamine, or the mixture of ethyleneamines is such that a 10% solution of the flame retardant composition in water has a pH of 2.02 to 6.5, and the ethyleneamine has three or more nitrogen atoms;
    additionally comprising about 0.25 to 1%, relative to the weight of the flame retardant containing composition, of an anti drip agent; and 4.0 to 30%, relative to the weight of the flame retardant containing composition, of a compound selected from the group consisting of melamine, melamine phosphate, melamine pyrophosphate, and mixtures thereof.

11. The flame retardant containing composition of claim 10 in which the polymer is a thermoplastic polymer selected from the group consisting of polyesters, synthetic aliphatic or aromatic polyamides, polyolefins, polycarbonates, polyvinyl chloride, copolymers of vinyl chloride, polyvinyl acetate, polystyrenics, polyacrylates, polycarbonates, polyphenoloxide, and ethylene vinyl acetates.

12. The flame retardant containing composition of claim 10 in which the polymer is selected from the group consisting of polyethylene, ethylene copolymers, polypropylene, propylene copolymers, acrylonitrile-butadiene-styrene, methacrylic acid ionomers, and polystyrene.

13. The flame retardant containing composition of claim 10 in which the polymer is selected from the group consisting of polypropylene, propylene copolymers, polyethylene, and ethylene copolymers.

14. A flame retardant composition prepared by a method comprising the steps of:
   a) reacting ethylene diamine, an ethyleneamine, or a mixture of ethyleneamines with formaldehyde and melamine,
   b) reacting the product of step a) with an acid selected from the group consisting of phosphoric acid, polyphosphoric acid, pyrophosphoric acid, and mixtures thereof;
   in which the ratio of the acid or acid mixture to the ethylene diamine, the ethyleneamine, or the mixture of ethyleneamines is such that a 10% solution of the flame retardant composition in water has a pH of 2.02 to 10.5, and the ethyleneamine has three or more nitrogen atoms.

15. The flame retardant composition of claim 14 in which the method additional comprises the step of:
   c) heating the product of step b) at a temperature of about 60° C. to about 340° C. for less than 60 minutes under vacuum of less than 30 inches of Hg to form the flame retardant composition.

16. The flame retardant composition of claim 14 in which step a) is the step of reacting ethylene diamine with polyphosphoric acid.

17. The flame retardant composition of claim 4 in which the method comprises the step (b).

18. The flame retardant composition of claim 17 in which the ethyleneamine or mixture of ethyleneamines is selected from the group consisting of diethylenetriamine, triethylenetetramine, tetraethylenepentamine, pentaethylene hexamine, and mixtures thereof.

19. The flame retardant containing composition of claim 6 in which the composition additionally comprises 0.25 to 1%, relative to the weight of the flame retardant containing composition, of an antidrip agent.

20. The flame retardant containing composition of claim 19 in which the method comprises the step (a).

21. The flame retardant composition of claim 5 in which the method comprises the step (a).

22. The flame retardant composition of claim 3 in which the method additionally comprises the step of purifying the polyphosphoric acid by ion exchange.

23. The flame retardant containing composition of claim 9 in which the method additionally comprises the step of purifying the polyphosphoric acid by ion exchange.

24. The flame retardant containing composition of claim 6 in which the flame retardant composition is a molecular dispersion.

25. The flame retardant containing composition of claim 24 in which the polymer is polypropylene or polyethylene.

* * * * *